US011686379B1

(12) United States Patent
Stenvall (10) Patent No.: US 11,686,379 B1
(45) Date of Patent: Jun. 27, 2023

(54) CONTROLLABLE SPEED DIFFERENTIAL (71) Applicant: Polestar Performance AB, Gothenburg (SE)

(72) Inventor: Lars Stenvall, Gothenburg (SE)

(73) Assignee: Polestar Performance AB, Gothenburg (SE)

(*) Notice: Subject to any disclaimer, the term of this patent is extended or adjusted under 35 U.S.C. 154(b) by 0 days.

(21) Appl. No.: 17/586,239

(22) Filed: Jan. 27, 2022

(51) Int. Cl.
*F16H 48/20* (2012.01)
*F16H 48/10* (2012.01)
*F16H 48/11* (2012.01)
*F16H 48/36* (2012.01)

(52) U.S. Cl.
CPC ............ *F16H 48/11* (2013.01); *F16H 48/20* (2013.01); *F16H 48/36* (2013.01); *F16H 2048/106* (2013.01); *F16H 2048/202* (2013.01)

(58) Field of Classification Search
CPC .... F16H 48/11; F16H 48/20; F16H 2048/106; F16H 2048/202; F16H 48/10; F16H 2048/205; F16H 48/36; F16H 2048/364; F16H 2048/366
See application file for complete search history.

(56) References Cited

U.S. PATENT DOCUMENTS

| | | | | |
|---|---|---|---|---|
| 5,417,298 A | * | 5/1995 | Shibahata | F16H 48/36 180/247 |
| 7,056,252 B2 | * | 6/2006 | Gumpoltsberger | F16H 48/10 475/221 |
| 7,601,086 B2 | * | 10/2009 | Rosemeier | F16H 37/0813 475/5 |
| 8,666,628 B2 | * | 3/2014 | Noguchi | F16H 48/36 701/72 |
| 9,321,480 B2 | | 4/2016 | Suzuki et al. | |
| 9,527,382 B2 | * | 12/2016 | Smetana | B60K 1/02 |
| 10,065,489 B2 | | 9/2018 | Wang et al. | |
| 10,144,284 B2 | | 12/2018 | Christensen et al. | |
| 10,203,028 B2 | * | 2/2019 | Kubo | F16H 48/36 |
| 10,221,931 B2 | | 3/2019 | Nasu et al. | |
| 10,514,087 B2 | | 12/2019 | Nakayama et al. | |
| 10,724,618 B2 | * | 7/2020 | Brown | B60K 1/00 |

(Continued)

FOREIGN PATENT DOCUMENTS

DE 102011088888 A1 * 6/2013 ............. B60K 17/16
FR 2837756 A1 10/2003

*Primary Examiner* — Sherry L Estremsky
(74) *Attorney, Agent, or Firm* — Kilpatrick Townsend & Stockton LLP (57) ABSTRACT A vehicle differential configured to enable variable speed between a first output shaft and a second output shaft, the vehicle differential including a ring gear, a first planetary gear carrier, the first planetary gear carrier carrying a plurality of first planetary gears at least partially positioned within the ring gear, the first planetary gear carrier operably coupled to a first output shaft, a second planetary gear carrier, the second planetary gear carrier carrying a plurality of second planetary gears at least partially positioned within the ring gear, the second planetary gear carrier operably coupled to a second output shaft, a first sun gear at least partially positioned within the plurality of first planetary gears, a second sun gear at least partially positioned within plurality of the second planetary gears, and a distributor shaft and reversal gear operably coupling the first sun gear to the second sun gear.

19 Claims, 9 Drawing Sheets

(56) References Cited

U.S. PATENT DOCUMENTS

| | | |
|---|---|---|
| 11,111,996 B2 | 9/2021 | Chu |
| 2005/0070391 A1* | 3/2005 | Folsom ................ B60K 17/046 475/23 |
| 2018/0345949 A1 | 12/2018 | Holmes et al. |
| 2021/0101477 A1 | 4/2021 | Gaither et al. |

* cited by examiner

CONTROLLABLE SPEED DIFFERENTIAL

TECHNICAL FIELD

The present disclosure relates generally to vehicle drive systems, and more particularly to a controllable speed differential representing a more energy efficient and performance effective alternative to conventional limited slip differential and four-wheel-drive and two-wheel-drive disconnect systems.

BACKGROUND

A vehicle engine and transmission is used to turn a drive shaft of the vehicle, which in turn drives the axle shafts and the wheels. In particular, the drive shaft is usually connected to a differential, which transfers the rotational energy of the drive shaft to the axle shafts and wheels of the vehicle. When a vehicle is driving in a straight line, the wheels on the left side of the vehicle and the wheels on the right side of the vehicle rotate at the same speed. However, when the vehicle makes a turn, the wheels on the outside of the turn must travel farther than the wheels on the inside of the turn. Consequently, the wheels on the outside of the turn must rotate at a slightly faster rate than the inside wheels during the turn. Thus, the use of a differential enables opposing axle shafts on opposite sides of the vehicle to rotate at different speeds, which enables the driving wheels of the vehicle to rotate at the proper speed to accommodate a turn.

Conventional differentials (sometimes referred to as "open differentials") have an even torque distribution between the driven wheels. That is, the wheel with the least amount of traction typically determines the maximum transferable torque, which in higher performance vehicles can result in unacceptable slippage in the wheel with less traction. In particular, traction problems often occur during cornering, where as a result of a weight transfer, the inside wheel (which has a slower speed than the outside wheel) lifts and starts to slip. As opposed to an open differential, a "locked differential" locks the wheels together, such that the wheels rotate together at the same speed, such that torque distribution between the wheels varies inversely to the amount of traction in each wheel. Although a locked differential can be useful in extreme circumstances, locked differentials do not enable one wheel to travel faster than the other to accommodate turns.

A limited slip differential combines the benefits of an open differential with a locked differential, such that it enables both different speeds between the wheels (like an open differential) and torque transfer between the wheels (like a locked differential). The result is transfer of torque to the non-slipping wheel, which when cornering tends to keep the inside wheel from slipping, thereby introducing and understeer effect on front wheel drive vehicles and an over-steer effect on rear-wheel drive vehicles.

To address traction problems, many vehicles employ four-wheel-drive. Four-wheel-drive, as opposed to either rear-wheel drive or front-wheel-drive, typically requires a transfer case powering a front and rear differential. Unfortunately, the addition of a transfer case and second differential can significantly affect frictional and drag losses. Although some vehicles include a disconnect system enabling selective switching from four-wheel-drive to two-wheel-drive, much of the frictional and drag losses of the transfer case and second differential are still present. Moreover, frequently the vehicle must be stationary to switch between four-wheel-drive and two-wheel-drive.

Accordingly, traditional methods of improving traction in high-performance vehicles must be balanced against an increase in frictional and drag losses, which negatively affects energy/fuel efficiency and driving range capabilities. The present disclosure addresses this concern.

SUMMARY OF THE DISCLOSURE

Embodiments of the present disclosure provide a controllable speed differential, which combines the benefits of a conventional limited slip differential with a power disconnect (e.g., selective four-wheel-drive to two-wheel-drive switching) through manipulation of a single gear. In some embodiments, the control speed distributor can further enable the distribution of torque to the wheel with the highest potential traction (e.g., the outside wheel during cornering) in anticipation of any actual changes in traction between the wheels (referred to herein as "torque vectoring"). Accordingly, embodiments of the present disclosure can provide the advantage of increased cornering capability and acceleration performance enabling greater amounts of power to be transmitted through the driving wheels.

One embodiment of the present disclosure provides a vehicle differential configured to enable variable speed between a first output shaft and a second output shaft, the vehicle differential including a ring gear, a first planetary gear carrier, the first planetary gear carrier carrying a plurality of first planetary gears at least partially positioned within the ring gear, the first planetary gear carrier operably coupled to a first output shaft, a second planetary gear carrier, the second planetary gear carrier carrying a plurality of second planetary gears at least partially positioned within the ring gear, the second planetary gear carrier operably coupled to a second output shaft, a first sun gear at least partially positioned within the plurality of first planetary gears, a second sun gear at least partially positioned within the plurality of second planetary gears, and a distributor shaft and reversal gear operably coupling the first sun gear to the second sun gear.

In one embodiment, the ring gear defines a set of teeth along an outer circumference configured to mesh with one or more gears of the vehicle transmission. In one embodiment, rotation of the ring gear causes rotation of the plurality of first planetary gears and the plurality of second planetary gears. In one embodiment, the first output shaft and the second output shaft are configured to rotate at an equal speed to one another when the first sun gear, second sun gear, distributor shaft, and reversal gear are not rotating. In one embodiment, rotation of the first sun gear causes an equal and opposite rotation in the second sun gear, thereby creating a rotational speed differential between the first output shaft and the second output shaft. In one embodiment, contact between the ring gear and the plurality of first planetary gears and the plurality of second planetary gears provides a gear reduction ratio of at least one of about 1:1.2, about 1:1.3, about 1:1.4, about 1:1.5, about 1:1.6, about 1:1.7, about 1:1.8, about 1:1.9, or about 1:2. In one embodiment, disengagement between the distributor shaft and reversal gear enables freewheeling rotation of the first output shaft and second output shaft.

Another embodiment of the present disclosure provides a vehicle differential system configured to enable torque vectoring between a first output shaft and a second output shaft, the vehicle differential including a ring gear, a first planetary gear carrier, the first planetary gear carrier carrying a plurality of first planetary gears at least partially positioned within the ring gear, the first planetary gear carrier operably coupled to a first output shaft, a second planetary gear carrier, the second planetary gear carrier carrying a plurality of second planetary gears at least partially positioned within the ring gear, the second planetary gear carrier operably coupled to a second output shaft, a first sun gear at least partially positioned within the plurality of first planetary gears, a second sun gear at least partially positioned within the plurality of second planetary gears, and a distributor shaft and reversal gear operably coupling the first sun gear to the second sun gear, wherein at least one of the first sun gear, second sun gear, distributor shaft, or reversal gear is operably coupled to an electronic machine configured to modify rotation of the first sun gear, second sun gear, distributor shaft, and reversal gears to control a relative rotational speed between the first output shaft and the second output shaft.

In one embodiment, the electronic machine is configured to inhibit rotation of at least one of the first sun gear, second sun gear, distributor shaft, or reversal gear. In one embodiment, the electronic machine is configured to actively rotate at least one of the first sun gear, second sun gear, distributor shaft, or reversal gear. In one embodiment, vehicle differential system further includes an electronic control unit configured to control the electronic machine. In one embodiment, the electronic control unit is operably coupled to a vehicle sensor. In one embodiment, the vehicle sensor is at least one of a steering wheel angle sensor, speed sensor, accelerometer, vibration sensor, or pressure sensor.

The summary above is not intended to describe each illustrated embodiment or every implementation of the present disclosure. The figures and the detailed description that follow more particularly exemplify these embodiments.

BRIEF DESCRIPTION OF THE DRAWINGS

The disclosure can be more completely understood in consideration of the following detailed description of various embodiments of the disclosure, in connection with the accompanying drawings, in which.

While embodiments of the disclosure are amenable to various modifications and alternative forms, specifics thereof shown by way of example in the drawings will be described in detail. It should be understood, however, that the intention is not to limit the disclosure to the particular embodiments described. On the contrary, the intention is to cover all modifications, equivalents, and alternatives falling within the spirit and scope of the subject matter as defined by the claims.

DETAILED DESCRIPTION

Figure 1:
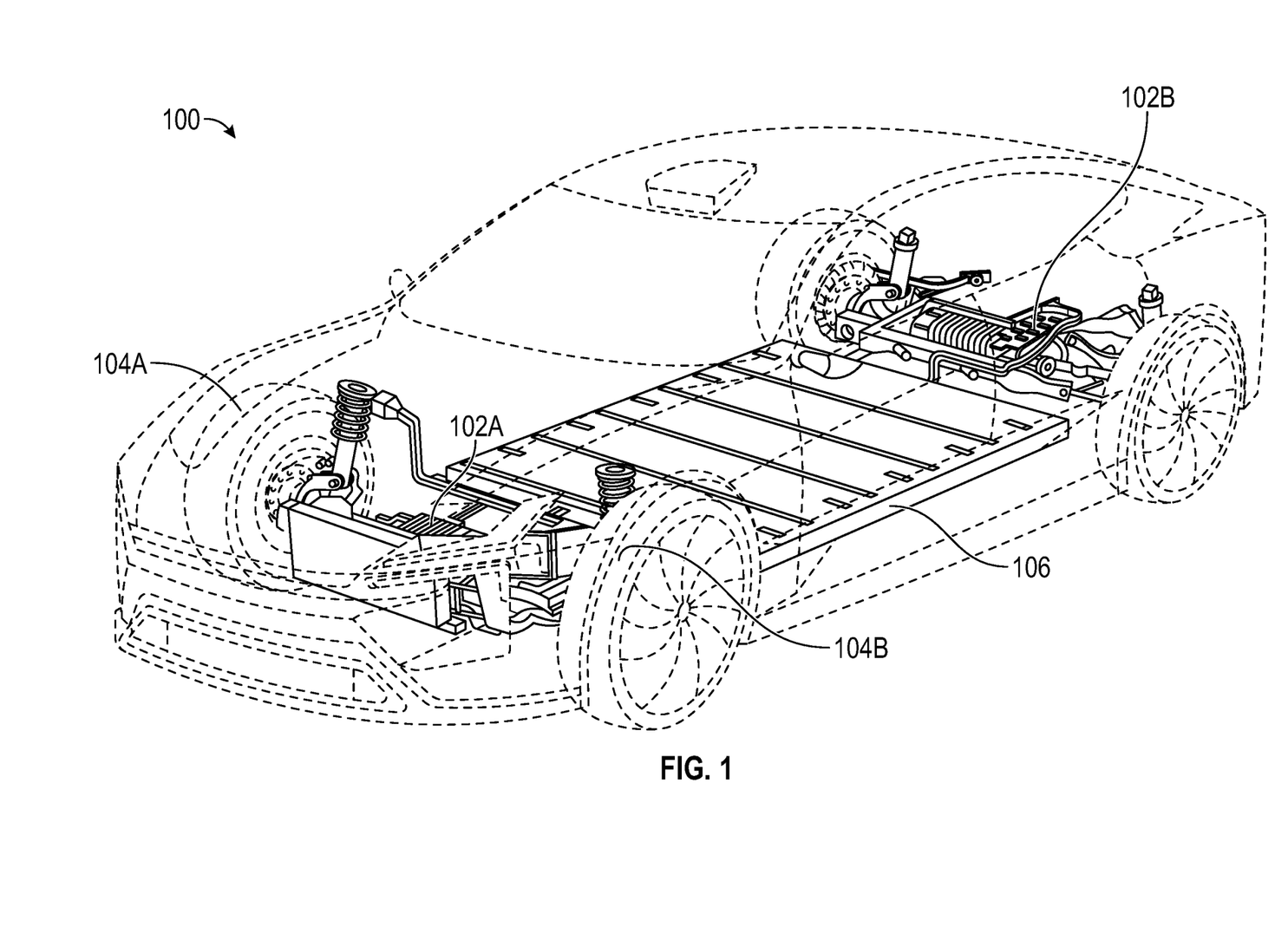
FIG. 1 is a perspective view depicting a vehicle including a controllable speed differential configured to enable a transfer of torque between left and right wheels, while the left and right wheels rotate at different speeds, in accordance with an embodiment of the disclosure.

Referring to FIG. 1, a vehicle 100 comprising a controllable speed differential 102A configured to enable a transfer of torque between left and right wheels 104A, 104B, while the left and right wheels 104A, 104B rotate at different speeds, is depicted in accordance with an embodiment of the disclosure. As depicted, in some embodiments, the controllable speed differential 102A can be utilized in an electric vehicle; although use of the controllable speed differential 102A in conjunction with an internal combustion engine is also contemplated.

Various embodiments of the present disclosure will be described in detail with reference to the drawings, wherein like reference numerals represent like parts and assemblies throughout the several views. Various directions and orientations, such as "upward," "downward," "top," "bottom," "upper," "lower," "left," "right," etc. are generally described herein with reference to the drawings in the usual gravitational frame of reference, regardless of how the components may be oriented.

The term "electric vehicle" as used herein may refer to an all-electric vehicle, also referred to as an EV, a plug-in hybrid vehicle, also referred to as a PHEV, or a hybrid vehicle, also referred to as a HEV, where a hybrid vehicle refers to a vehicle utilizing multiple propulsion sources one of which is an electric drive system. The term "battery pack" can refer to multiple individual batteries contained within a single piece or multi-piece housing, the individual batteries electrically interconnected to achieve the desired voltage and capacity for a particular application. As such, the terms "battery pack" and "battery cell" may be used interchangeably and may refer to any of a variety of different cell types, chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configurations.

Figure 2:
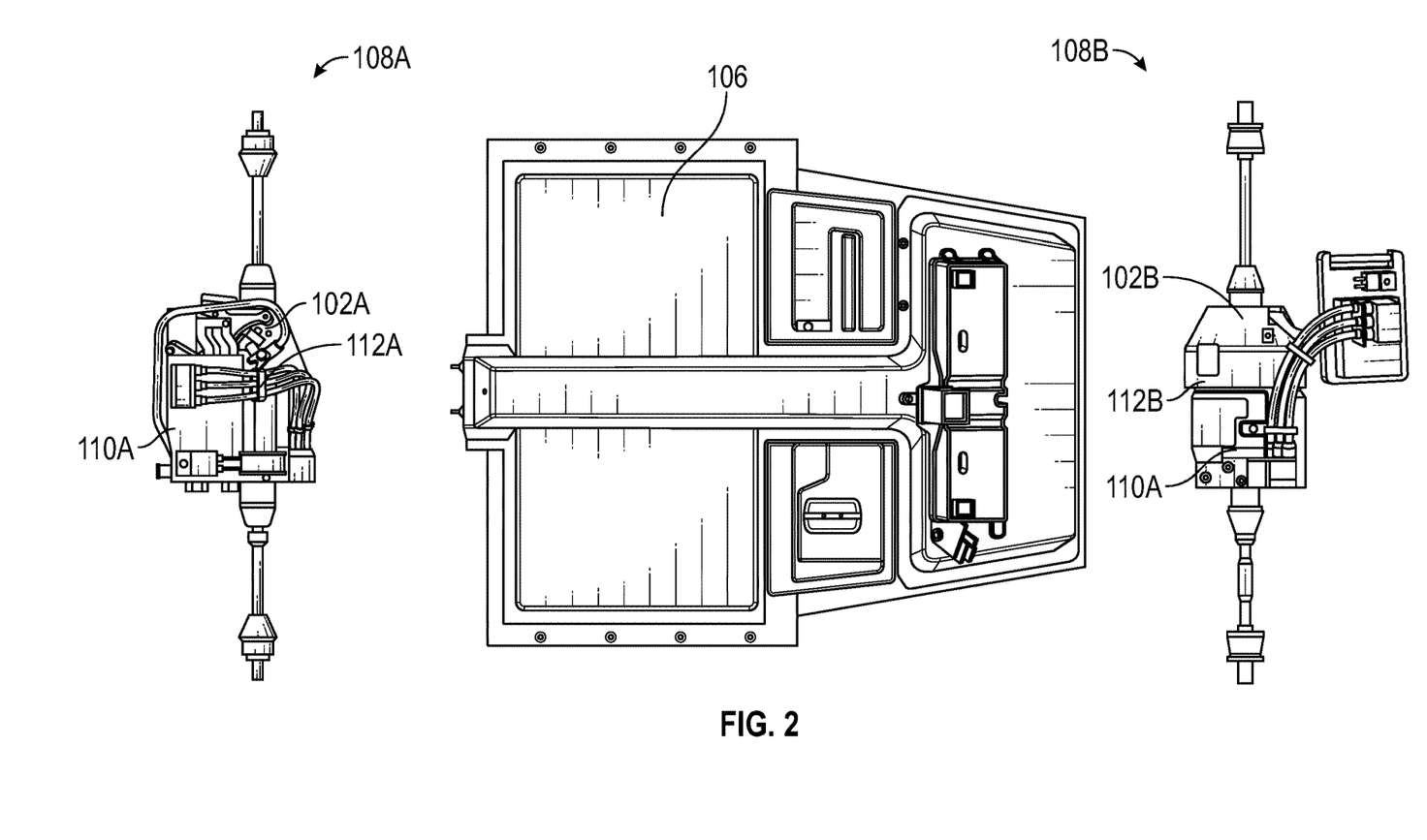
FIG. 2 is a schematic view depicting components of an electric vehicle including a battery pack with independent front and rear drivetrains, in accordance with an embodiment of the disclosure.

With additional reference to FIG. 2, in some embodiments the vehicle 100 can include a battery pack 106 configured to selectively power two independent powertrains 108A, 108B.

Each powertrain 108A, 108B can include a motor 110A, 110B, transmission 112A, 112B and controllable speed differential 102A, 102B. In embodiments, each powertrain 108A, 108B can function independently. Accordingly, in some embodiments, the battery pack 106 can selectively power the front powertrain 108A (e.g., enabling front-wheel-drive), rear powertrain 108B (e.g., enabling rear wheel drive), or both the front and rear powertrains 108A, 108B together (e.g., enabling four-wheel-drive, all-wheel-drive, etc.).

When actively powered, each controllable speed differential 102A is configured to enable a variable amount of torque to be transferred from the motor 110A or transmission 112A to the left and right wheels 104A, 104B in proportion to the amount of traction experienced by each wheel 104A, 104B. Accordingly, much like a locked differential, where one wheel has little or no traction, up to 100% of the available torque can be transferred to the opposite wheel to ensure that the maximum amount of available torque can be transmitted to the wheels at all times. To inhibit slippage while cornering, each controllable speed differential 102A is further configured to enable the left and right wheel 104A, 104B to rotate at different speeds, similar to that of an open differential or limited slip differential.

In some embodiments, the torque transfer and rotational speed of the wheels 104A, 104B can be passively powered as dictated by the frictional forces experienced by each wheel 104A, 104B. In other embodiments, the torque transfer and rotational speed can be actively powered or controlled through a clutch mechanism, friction pack, electronic machine or other mechanism based on driver feedback (e.g., position of the steering wheel, etc.).

When not actively powered, the unpowered wheels can operate in a freewheeling mode, in which the wheels 104A, 104B are uncoupled from the powertrain 108A. Specifically, power to the wheels 104A, 104B can be disconnected by the controllable speed differential 102A, to reduce the number of gears or other components that continue to rotate while the wheels are in the freewheeling mode, thereby reducing frictional losses. In embodiments, the power connect/disconnect to either of the front or rear drivetrain can be affected through manipulation of a single gear or clutch mechanism.

Figure 3:
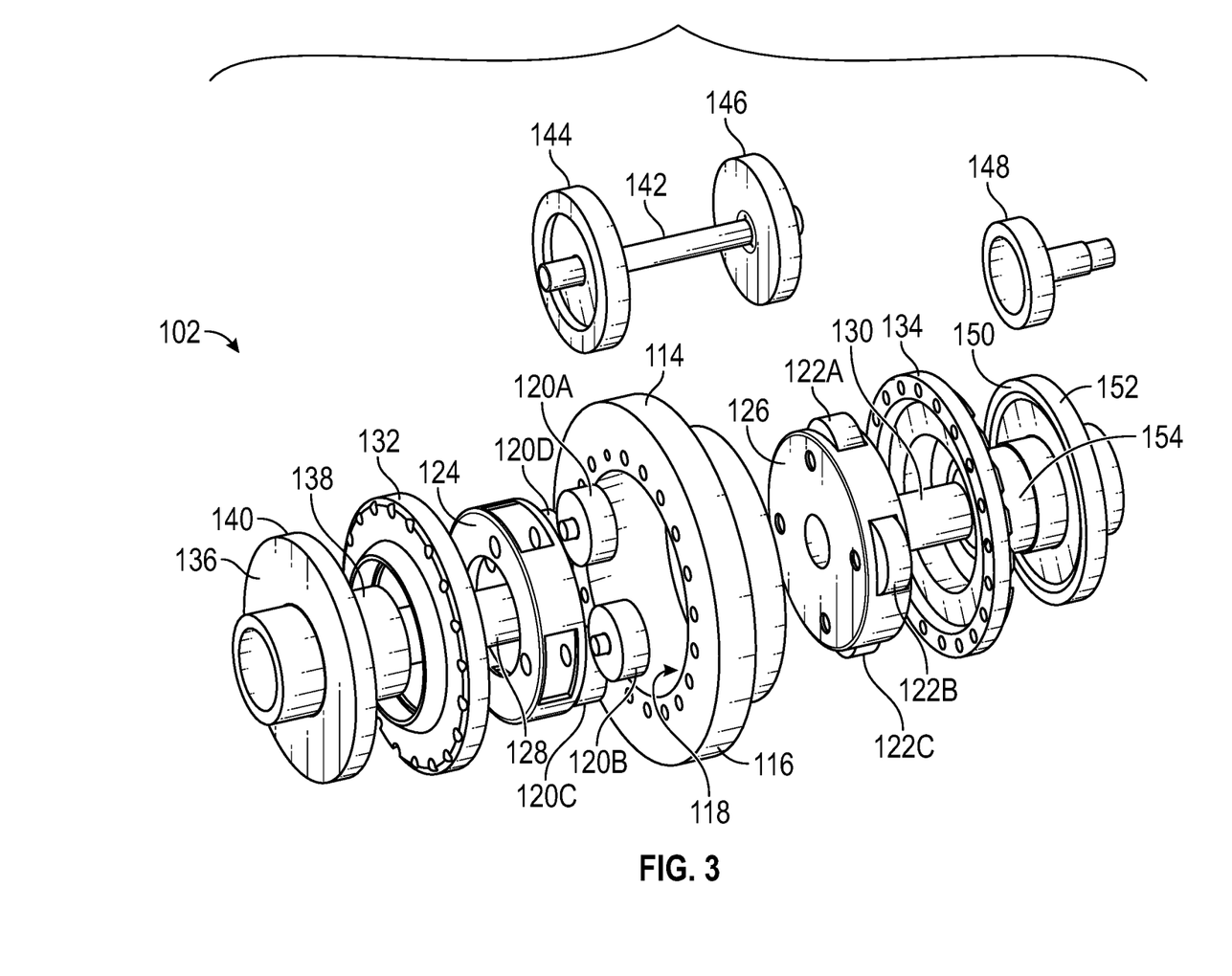
FIG. 3 is an exploded, perspective view depicting a controllable speed differential, in accordance with an embodiment of the disclosure.
Figure 4A:
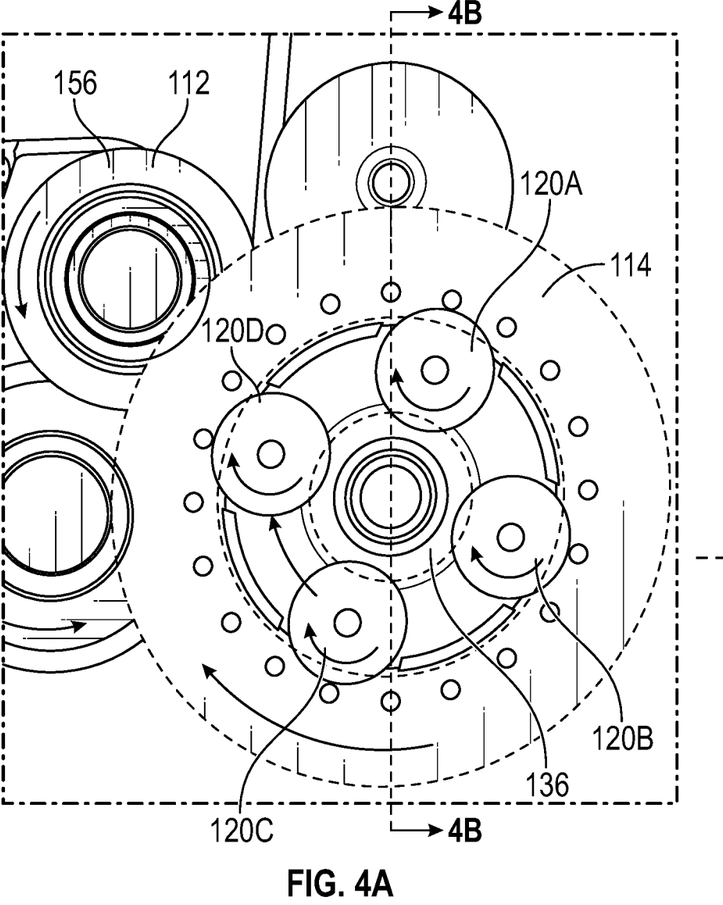
FIG. 4A is a profile view depicting the controllable speed differential of FIG. 3, in accordance with an embodiment of the disclosure.
Figure 5:
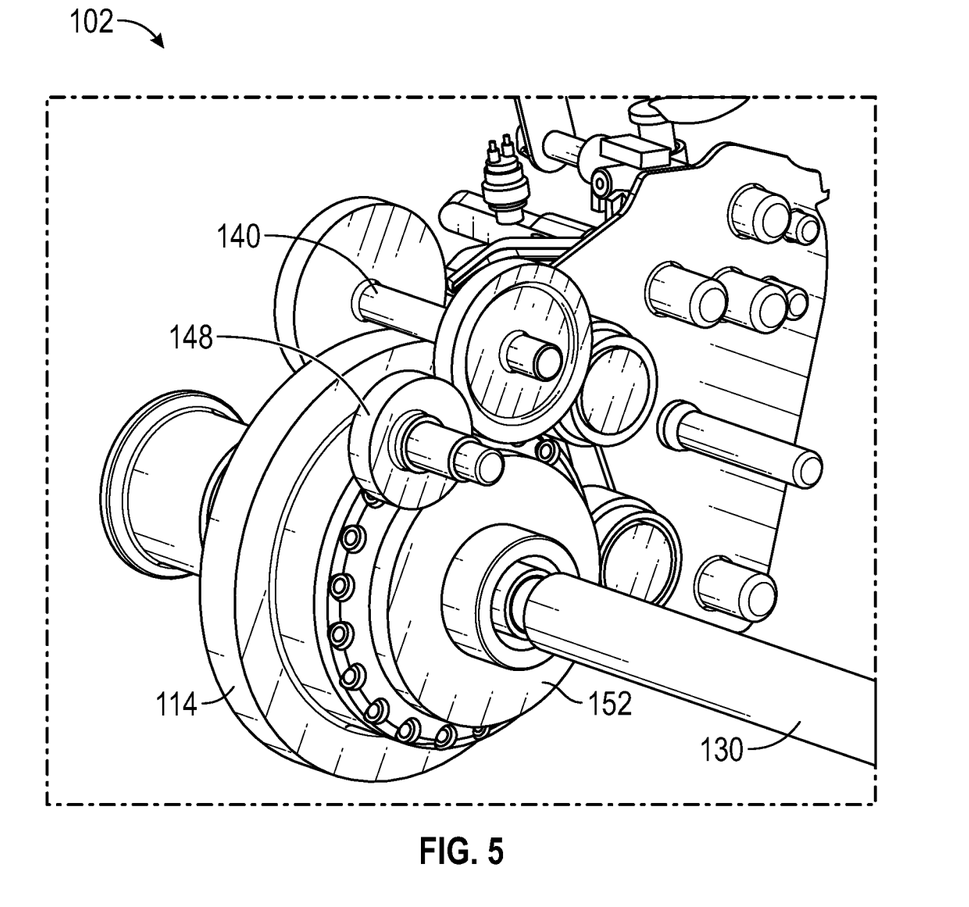
FIG. 5 is a perspective view depicting the assembled controllable speed differential operably coupled to a vehicle transmission, in accordance with an embodiment of the disclosure.

Referring to FIG. 3, an exploded perspective view of a controllable speed differential 102 is depicted in accordance with an embodiment of the disclosure. In embodiments, the controllable speed differential 102 can include a ring gear 114 defining an outer set of teeth 116 and an inner set of teeth 118. The outer set of teeth 116 can be defined along an outer circumference of the ring gear 114 and can be configured to selectively mesh with a final gear of a transmission 112 (as depicted in FIGS. 4 and 5). The inner set of teeth 118 can be defined along an inner circumference of the ring gear 114 and can be configured to mesh with a plurality of left planetary gears 120A-D and right planetary gears 122A-D, each of the left and right planetary gear sets collectively housed within a corresponding left and right planetary gear carrier 124, 126. Each of the left and right planetary gear carriers 124, 126 can be operably coupled to a corresponding left output shaft 128 and right output shaft 130 to respectively drive the left and right wheels. A left and right gear ring hub 132, 134 can be operably coupled to the ring gear 114 as an aid in retaining the left and right planetary gear carriers 124, 126 within the ring gear 114. Although four planetary gears are depicted on each of the left and right side, a greater or lesser number of planetary gears (e.g., three gears, five gears, etc.) is also contemplated.

Figure 4B:
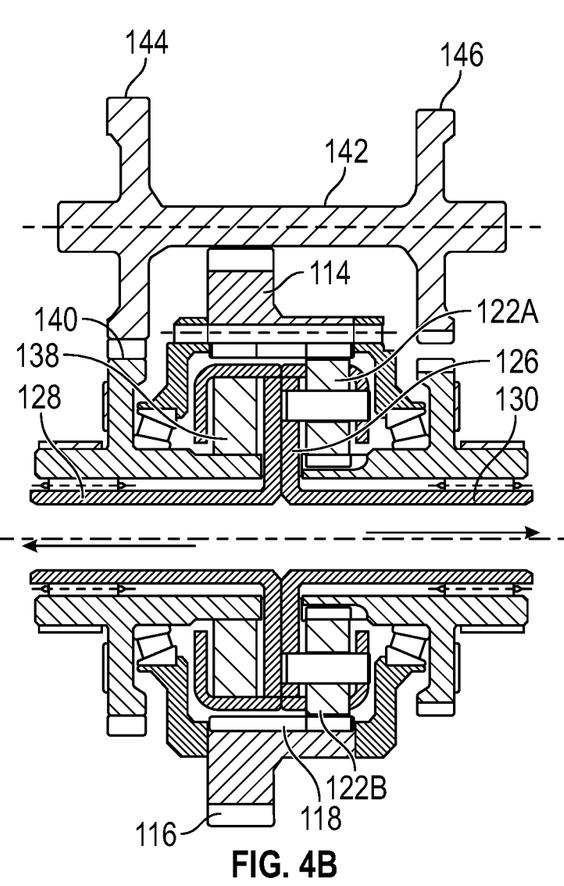
FIG. 4B is a cross-sectional view depicting the controllable speed differential of FIG. 4, in accordance with an embodiment of the disclosure.

With additional reference to FIGS. 4 and 4A, which further depict a profile view and cross-sectional views of the controllable speed differential 102 of FIG. 3, and FIG. 5 which depicts a perspective view of the controllable speed differential 102 of FIG. 3, it can be seen that rotation of the ring gear 114 causes a rotation of the left and right output shafts 128, 130. In particular, when the planetary gears 120A-D, 122A-D are driven by the inner set of teeth 118 of the ring gear 114, so as to drive rotation of the left and right planetary gear carrier 124, 126 and respective output shafts 128, 130. Accordingly, in this capacity, each of the output shafts 128, 130 rotate at the same speed, and transfer an approximately equal amount of torque from the motor to the wheels.

To inhibit wheel slippage while cornering, the controllable speed differential 102 is configured to enable one wheel to rotate at a different speed (e.g., faster or slower) than the other wheel. In particular, the controllable speed differential 102 can include a left torque distributor gear 136 (alternatively referred to as a left sun gear), which can define a first set of teeth 138 configured to mesh with the left planetary gears 120A-D, and a second set of teeth 140 configured to mesh with a torque distributor shaft 142. Specifically, the second set of teeth 140 of the left torque distributor gear 136 can mesh with a first set of teeth 144 of the torque distributor shaft 142. A second set of teeth 146 of the torque distributor shaft 142 can mesh with a torque reversal/switchgear 148, which in turn can mesh with a second set of teeth 150 of a right torque distributor gear 152 (alternatively referred to as a right sun gear). A first set of teeth 154 of the right torque distributor gear 152 can mesh with the right planetary gears 122A-D.

Collectively the left torque distributor gear 136, torque distributor shaft 142, torque reversal/switchgear 148, and right torque distributor gear 152, in combination with the left and right planetary gear carriers 124, 126 (e.g., housing the left and right planetary gears 120A-D, 122A-D) can enable the left and right wheels to rotate in an opposite direction relative to one another. Accordingly, when the ring gear 114 is stationary (e.g., nonrotating) rotation of the left wheel in a clockwise direction causes an equal and opposite rotation of the right wheel in the counterclockwise direction. When the ring gear 114 is rotating (e.g., in a clockwise direction), additional drag or friction on the left wheel (e.g., perceived as a moment in the counterclockwise direction, slightly slowing the left wheel) causes an equal and opposite reaction in the right wheel (e.g., slightly speeding up a rotation of the right wheel).

In operation, when driving in a straight line, the inner set of teeth 118 of the ring gear 114 drives the left and right planetary gears 120A-D, 122A-D, which in turn rotate the left and right planetary gear carriers 124, 136 around the left and right torque distributor gears 136, 152. Thus, when the left and right wheels rotate at the same speed the left and right torque distributor gears 136, 152 and torque distributor shaft 142 are nonrotating.

When cornering, the left and right torque distributor gears 136, 152, which are balanced to each other via the torque distributor shaft 142, rotate in opposite directions relative to one another to enable the outer wheel to rotate slightly faster than the inner wheel. Thus, for example, a left hand turn induces a speed difference between the left and right output shaft 128, 130 (e.g., causing a rotational speed of the right wheel to increase and of the left wheel to decrease), which is enabled through a counterclockwise rotation of the torque distributor shaft 148, thereby enabling the left and right torque distributor gears 136, 152 to rotate in opposite directions relative to each other. Conversely, a right-hand turn causes the torque distributor shaft 148 to rotate in a clockwise rotation, again enabling the left and right torque distributor gears 136, 152 to rotate in opposite directions relative to one another.

Further, to reduce requirements of the transmission 112, in some embodiments, the controllable speed differential 102 can provide a gear reduction, so as to serve as the final gear of the transmission 112. For example, in some embodiments, a meshing between the ring gear 114 and left and right planetary gears 120A-D, 122A-D can provide a gear reduction at a ratio of about 1:1.2, about 1:1.3, about 1:1.4, about 1:1.5, about 1:1.6, about 1:1.7, about 1:1.8, about 1:1.9, or about 1:2; although other gear reduction ratios are also contemplated.

To enable the wheels to operate in a freewheeling mode, such that they are unpowered by the motor, the transmission 112 can be decoupled from the ring gear 114, for example via a clutch or other decoupling mechanism 156, thereby enabling the left and right output shaft 128, 130 to rotate freely, independently from the motor. In some embodiments, free rotation of the left and right output shafts 128, 130 can result in rotation of the planetary gears 120A-D, 122A-D and ring gear 114, with the other components of the controllable speed differential 102 nonrotating, so as to reduce frictional losses when the wheels are unpowered.

In some embodiments, a relative speed of the left and right output shafts 128, 130 can be based on passive input in the form of an increase in friction or drag on one wheel relative to the other wheel, which in turn can cause the wheels to rotate at different speeds. In other embodiments, resistance or additional rotational force can be imparted on at least one of the left torque distributor gear 136, torque distributor shaft 142, torque reversal/switchgear 148, or right torque distributor gear 152 to affect an active torque vectoring.

Figure 6:
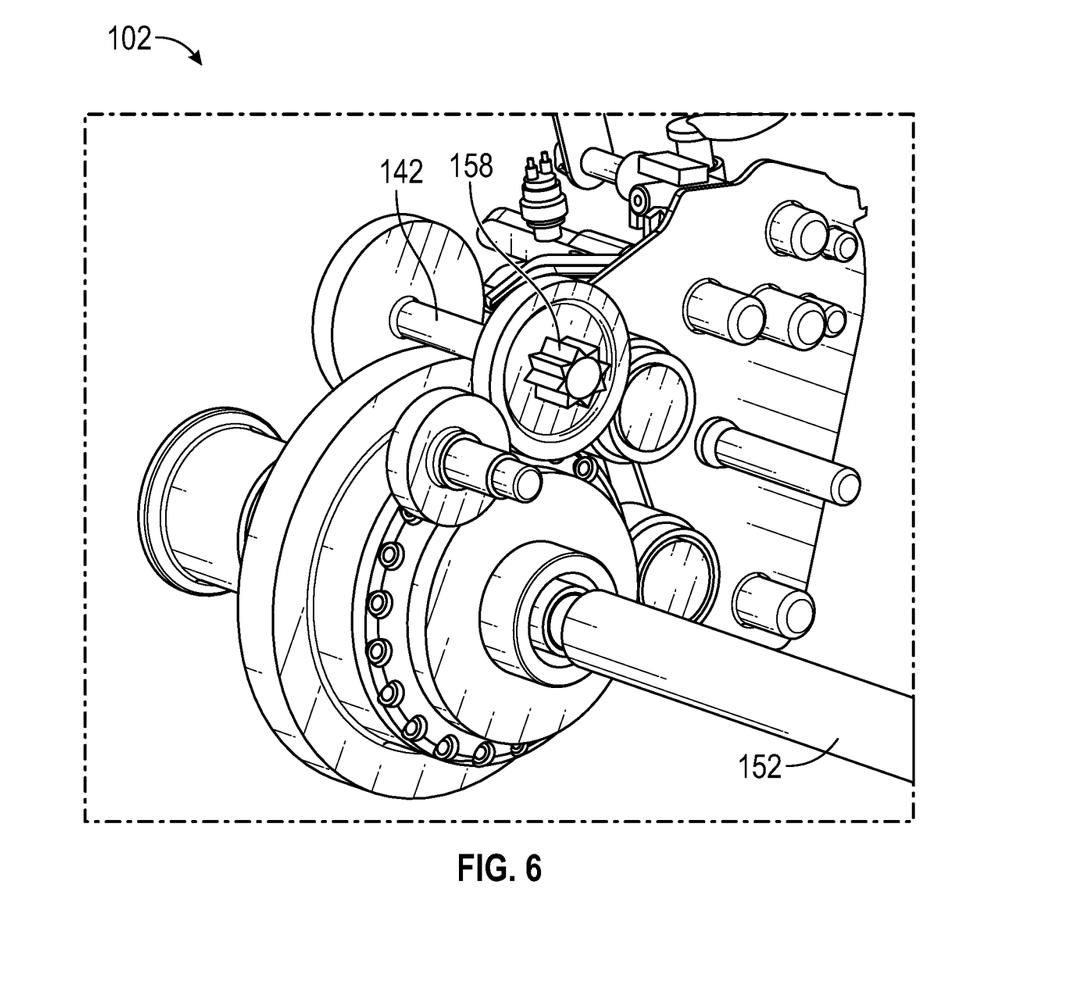
FIG. 6 is a perspective view depicting a controllable speed differential including a clutch mechanism configured to selectively position the controllable speed differential and a freewheeling mode, in which respective right and left output shaft are configured to rotate freely, in accordance with an embodiment of the disclosure.
Figure 7:
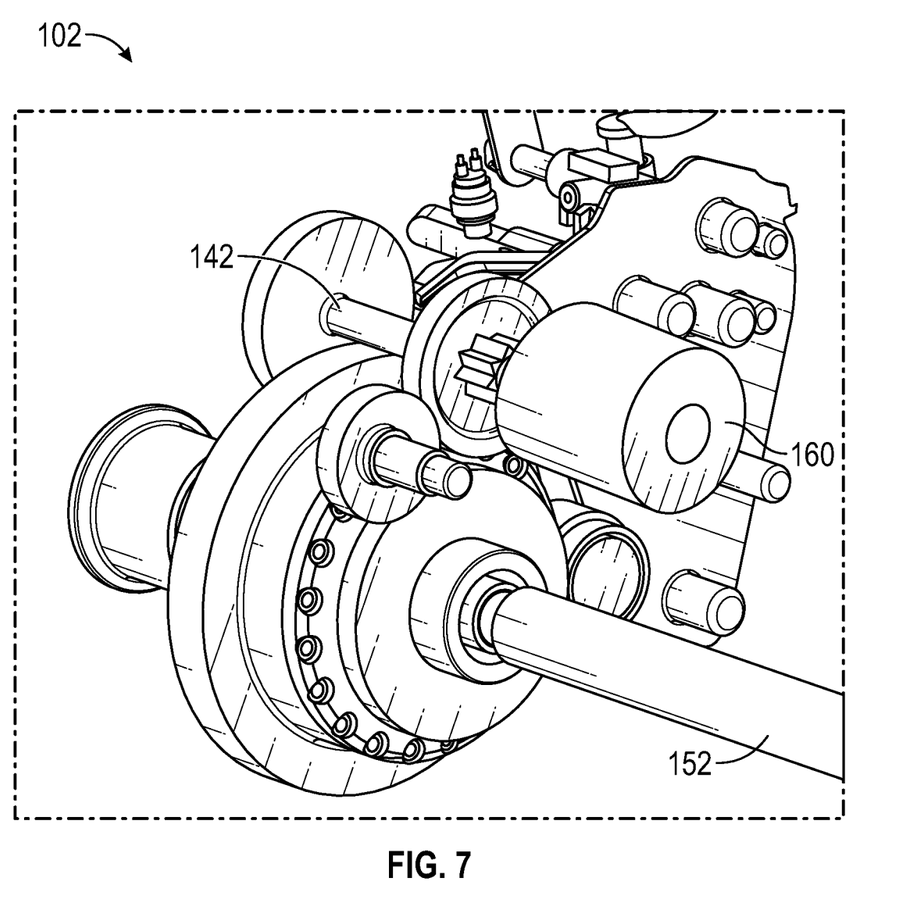
FIG. 7 is a perspective view depicting a controllable speed differential including an electronic machine configured to modify rotation of a distribution shaft, in accordance with an embodiment of the disclosure.
Figure 8A:
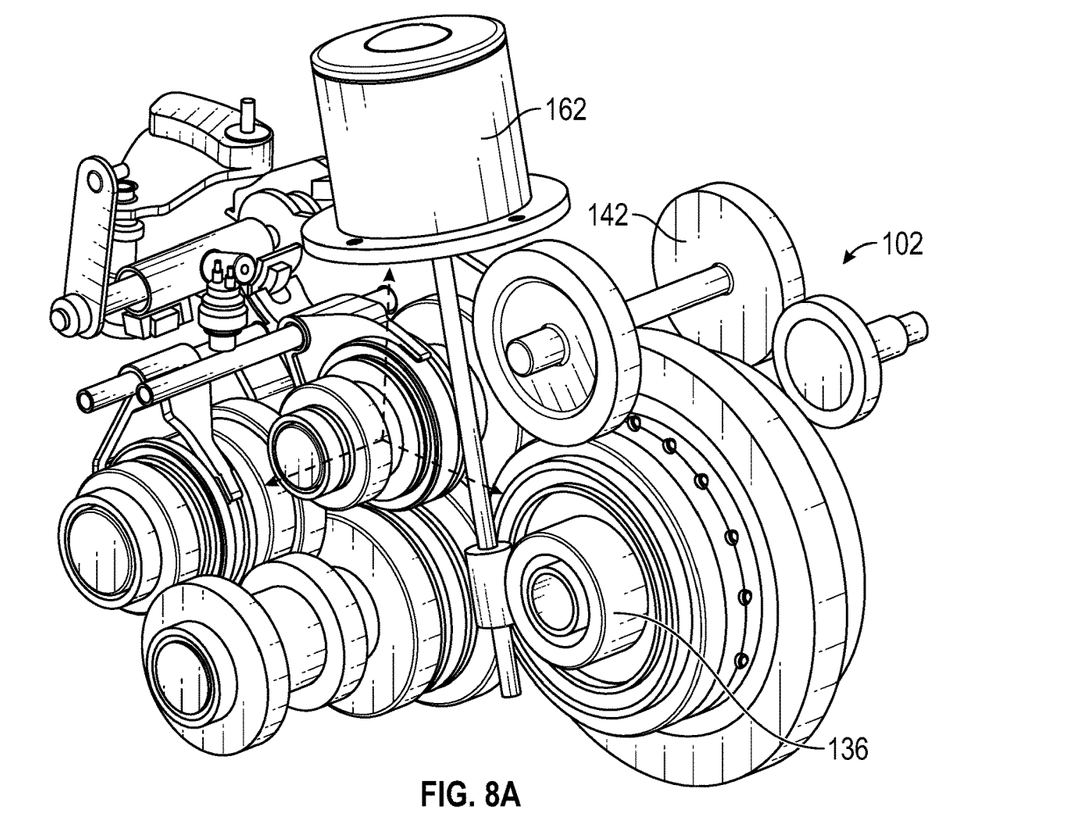
FIG. 8A is a perspective view depicting a controllable speed differential including an electronic machine configured to modify rotation of at least one of a left or right sun gear, in accordance with an embodiment of the disclosure.
Figure 8B:
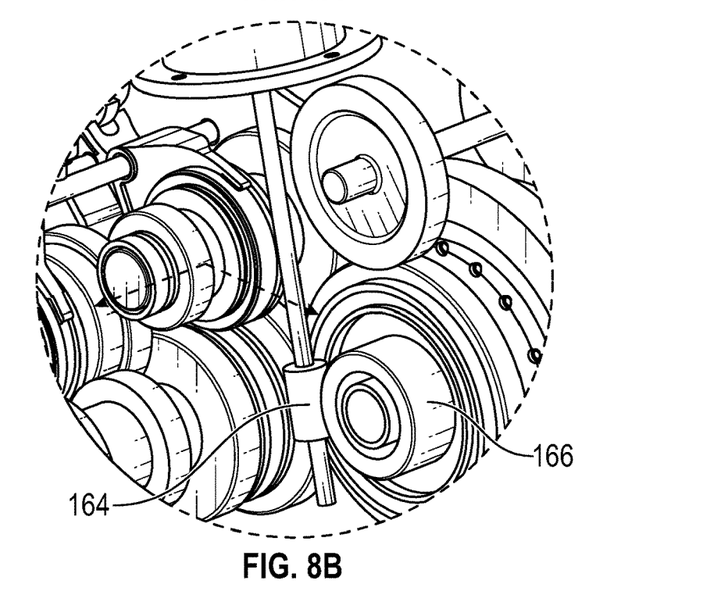
FIG. 8B is a close-up, perspective view of the controllable speed differential of FIG. 8A, in accordance with an embodiment of the disclosure.

For example, with addition reference to FIGS. 6-8, controllable speed differentials 102 including mechanisms configured to enable active torque vectoring between the left and right wheels are depicted in accordance with embodiments of the disclosure. Specifically, FIG. 6 depicts the controllable speed differential 102 including a dog clutch 158 mounted on the torque distributor shaft 142. In some embodiments, the dog clutch 158 can be configured to disengage the torque distributor shaft 142 from at least one of the left or right torque distributor gear 136, 152 or torque reversal/switchgear 148, thereby enabling the left and right output shafts 128, 130 to freely rotate relative to one another and to the ring gear 114. Accordingly, in some embodiments, the dog clutch 158 can be configured to selectively shift the controllable speed differential 102 into a freewheeling mode in which the left and right output shafts 128, 132 are configured to rotate independently from the motor and transmission 112.

FIG. 7 depicts a controllable speed differential 102 having a friction pack/electronic machine 160 configured to modify free rotation of the torque distributor shaft 142. Accordingly, in some embodiments, the friction pack/electronic machine 160 can restrain free rotation of the torque distributor shaft 142, which can serve to inhibit transfer of torque to a slipping wheel. By contrast, the friction pack/electronic machine 160 can actively rotate the torque distributor shaft 142 in either of the clockwise or counterclockwise directions at a desired speed to control the rotational speed and torque delivered between the left and right output shafts 128, 130.

Figure 9:
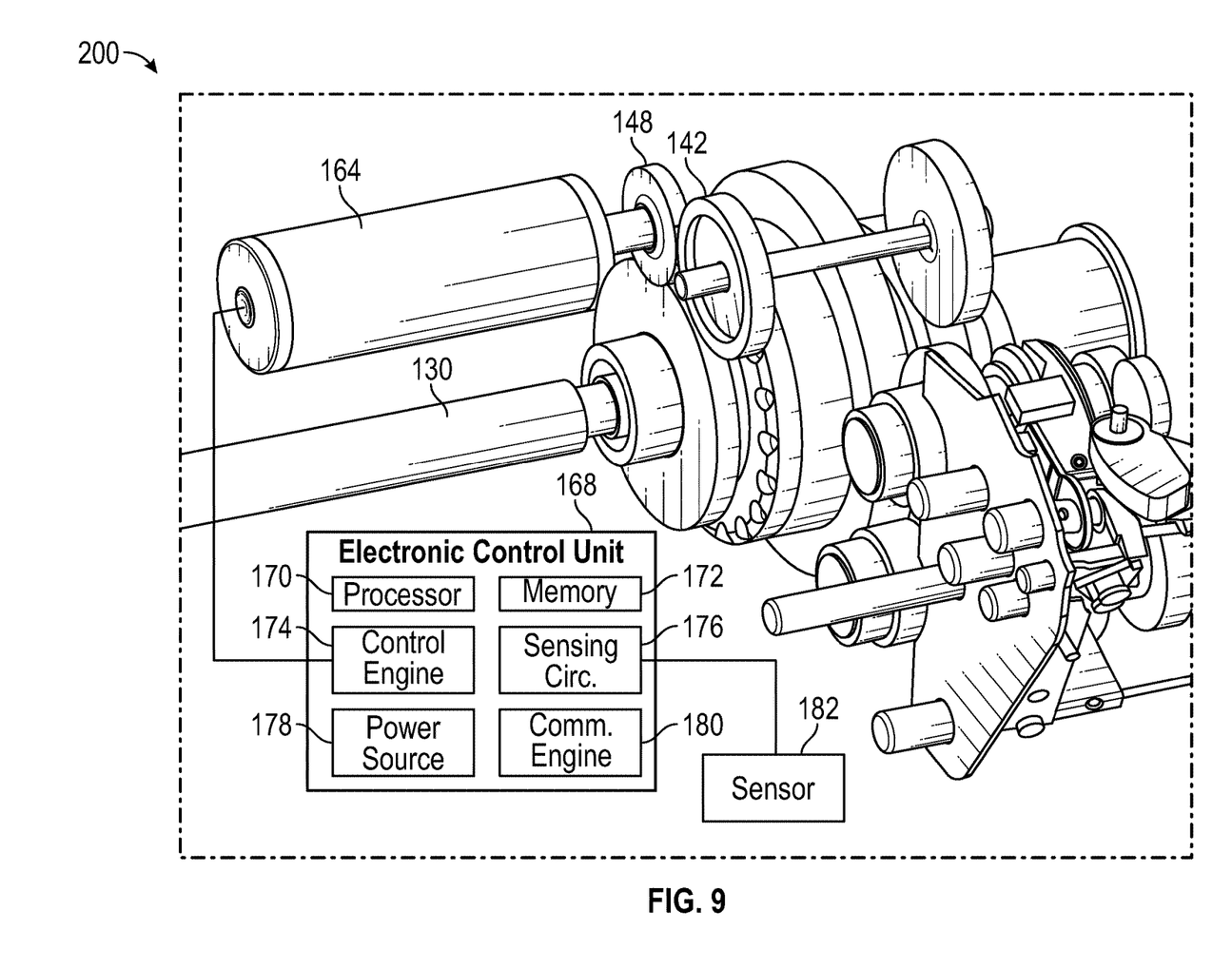
FIG. 9 is a block diagram depicting a controllable speed differential system including an electronic control unit configured to receive user input for selective control of the controllable speed differential, in accordance with an embodiment of the disclosure.

FIGS. 8A and 8B depict a controllable speed differential 102 also having a friction pack/electronic machine 162; however, instead of being directly coupled to the torque distributor shaft 142 the friction pack/electronic machine 162 can be coupled to either of the left or right torque distributor gears 136, 152. For example, in one embodiment, the friction pack/electronic machine 162 can be operably coupled to a worm gear 164 configured to mesh with a third set of teeth 166 defined along an outer perimeter of either of the left or right torque distributor gears 136, 152. Coupling the friction pack/electronic machine 162 at other locations, such as the torque reversal/switchgear 148 is also contemplated (e.g., as depicted in FIG. 9).

Accordingly, by increasing rotational resistance of friction, the friction pack/electronic machine 162 can inhibit a speed differential between the left and right output shafts 128, 130. Conversely, by actively powering rotation in either of the clockwise or counterclockwise directions, the friction pack/electronic machine 162 can create a speed and torque differential between the left and right output shafts 128, 130, potentially in anticipation of a desire by a driver for an increase in torque or wheel speed (e.g., to inhibit oversteer or understeer while cornering).

In order to control the friction pack/electronic machine, in some embodiments, the controllable speed differential 102 can be paired with an electronic control unit. For example, with additional reference to FIG. 9, a block diagram depicting a controllable speed differential system 200 including an electronic control unit (ECU) 168 configured to receive user input for selective control of the controllable speed differential 102 is depicted in accordance with an embodiment of the disclosure.

The ECU 168 or components thereof can comprise or include various modules or engines, each of which is constructed, programmed, configured, or otherwise adapted to autonomously carry out a function or set of functions. The term "engine" as used herein is defined as a real-world device, component, or arrangement of components implemented using hardware, such as by an application specific integrated circuit (ASIC) or field programmable gate array (FPGA), for example, or as a combination of hardware and software, such as by a microprocessor system and a set of program instructions that adapt the engine to implement the particular functionality, which (while being executed) transform the microprocessor system into a special-purpose device.

An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques.

Accordingly, each engine can be realized in a variety of physically realizable configurations, and should generally not be limited to any particular implementation exemplified herein, unless such limitations are expressly called out. In addition, an engine can itself be composed of more than one sub-engine, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

In some embodiments, ECU 168 can include a processor 170, memory 172, control engine 174, sensing circuitry 176, and power source 178. Optionally, in embodiments, ECU 168 can further include a communications engine 180. Processor 170 can include fixed function circuitry and/or programmable processing circuitry. Processor 170 can include any one or more of a microprocessor, a controller, a DSP, an ASIC, an FPGA, or equivalent discrete or analog logic circuitry. In some examples, processor 170 can include multiple components, such as any combination of one or more microprocessors, one or more controllers, one or more DSPs, one or more ASICs, or one or more FPGAs, as well as other discrete or integrated logic circuitry. The functions attributed to processor 170 herein may be embodied as software, firmware, hardware or any combination thereof.

Memory 172 can include computer-readable instructions that, when executed by processor 170 cause ECU 168 to perform various functions. Memory 172 can include volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital media.

Control engine 174 can include instructions to control the components of ECU 168 and instructions to selectively control the friction pack/electronic machine 164 to modify rotation of the torque reversal/switchgear 148. For example, based on conditions detected by the sensing circuitry 176 or the vehicle (e.g. other vehicle ECUs), control engine 174 can selectively activate one or more logic sequences (e.g., stored in the control engine 174 or memory 172) to add a frictional resistance to free rotation of the torque reversal/switchgear 148 or actively rotate the torque reversal/switchgear 148 in either of the clockwise or counterclockwise direction for the purpose of modifying a transfer of torque and relative rotational speeds between the left and right output shaft 128, 130.

In embodiments, sensing circuitry 176 can be configured to sense a variety of conditions related to operation of the vehicle 100. For example, sensing circuitry 176 can be configured to sense at least one of steering, cornering, speed, braking, acceleration, deceleration, road surface conditions, etc. accordingly, sensing circuitry 176 can include or can be operable with one or more sensors 182 (e.g., one or more steering wheel angle sensors, speed sensors, accelerometers, vibration sensors, pressure sensors, etc.).

Power source 178 is configured to deliver operating power to the components of ECU 168. Power source 178 can include a battery and a power generation circuit to produce the operating power (e.g., individual battery cells, etc.). In some examples, the power source 178 is rechargeable to allow extended operation. Power source 178 can include any one or more of a plurality of different battery types, such as nickel cadmium batteries, lithium ion batteries and the like.

Optionally, communications engine 180 can include any suitable hardware, firmware, software, or any combination thereof for communicating with other components of the vehicle and/or external devices (e.g., charging station, etc.). Under the control of processor 170, communication engine 180 can receive downlink telemetry from, as well as send uplink telemetry to one or more external devices using an internal or external antenna. In addition, communication engine 180 can facilitate communication with a networked computing device and/or a computer network.

Accordingly, if it is verified by the processor 170 that the vehicle 100 is in a right-hand turn or is about to commence a right-hand turn (e.g. via feedback via the steering wheel, etc.), the control engine 174 can actively power the friction pack/electronic machine 164 to affect a reduced rotational speed on the right output shaft 130, which will correspondingly causing a proportional increase in speed of the left output shaft 128. Conversely, in a left hand turn, the ECU 168 can control the friction pack/electronic machine 164 to affect a reduced rotational speed on the left output shaft 128. Accordingly, regardless of road friction and weight distribution, each of the left and right wheel will be traveling at the rotational speed to complete the turn without slippage, or potentially to produce the effect of a slight over steer in cornering.

Alternatively, during straightaway (e.g., non-cornering) rapid accelerations the ECU 168 can command the friction pack/electronic machine 164 to add resistance to free rotation of the torque reversal/switchgear 148, thereby inhibiting a difference in rotational speeds between the left and right wheels. Accordingly, the effect is an improvement in vehicle stability, handling, traction and acceleration, with improvements in maneuverability resulting in a reduced turning radius due to a predetermined speed distribution between the left and right wheels.

The invention is further illustrated by the following embodiments: A vehicle differential configured to enable variable speed between a first output shaft and a second output shaft, the vehicle differential comprising: a ring gear; a first planetary gear carrier, the first planetary gear carrier carrying a plurality of first planetary gears at least partially positioned within the ring gear, the first planetary gear carrier operably coupled to a first output shaft; a second planetary gear carrier, the second planetary gear carrier carrying a plurality of second planetary gears at least partially positioned within the ring gear, the second planetary gear carrier operably coupled to a second output shaft; a first sun gear at least partially positioned within the plurality of first planetary gears; a second sun gear at least partially positioned within the plurality of second planetary gears; and a distributor shaft and reversal gear operably coupling the first sun gear to the second sun gear.

A system or method according to any embodiment, wherein the ring gear defines a set of teeth along an outer circumference configured to mesh with one or more gears of the vehicle transmission.

A system or method according to any embodiment, wherein rotation of the ring gear causes rotation of the plurality of first planetary gears and the plurality of second planetary gears.

A system or method according to any embodiment, wherein the first output shaft and the second output shaft are configured to rotate at an equal speed to one another when the first sun gear, second sun gear, distributor shaft, and reversal gear are not rotating.

A system or method according to any embodiment, wherein rotation of the first sun gear causes an equal and opposite rotation in the second sun gear, thereby creating a rotational speed differential between the first output shaft and the second output shaft.

A system or method according to any embodiment, wherein contact between the ring gear and the plurality of first planetary gears and the plurality of second planetary gears provides a gear reduction ratio of at least one of about 1:1.2, about 1:1.3, about 1:1.4, about 1:1.5, about 1:1.6, about 1:1.7, about 1:1.8, about 1:1.9, or about 1:2.

A system or method according to any embodiment, wherein disengagement between the distributor shaft and reversal gear enables freewheeling rotation of the first output shaft and second output shaft.

A system or method according to any embodiment, further comprising an electronic machine configured to modify rotation of at least one of the first sun gear, second sun gear, distributor shaft, and reversal gears to control a relative rotational speed between the first output shaft and the second output shaft.

A system or method according to any embodiment, wherein the electronic machine is configured to inhibit rotation of at least one of the first sun gear, second sun gear, distributor shaft, or reversal gear.

A system or method according to any embodiment, wherein the electronic machine is configured to actively rotate at least one of the first sun gear, second sun gear, distributor shaft, or reversal gear.

A system or method according to any embodiment, further comprising an electronic control unit configured to control the electronic machine.

A system or method according to any embodiment, wherein the electronic control unit is operably coupled to a vehicle sensor.

A system or method according to any embodiment, wherein the vehicle sensor is at least one of a steering wheel angle sensor, speed sensor, accelerometer, vibration sensor, or pressure sensor.

An electric vehicle comprising the vehicle differential according to any embodiment of the disclosure.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. A vehicle differential comprising:
   a ring gear;
   a left planetary gear carrier, the left planetary gear carrier carrying a plurality of left hand planetary gears at least partially positioned within the ring gear, the left planetary gear carrier operably coupled to a left output shaft;
   a right planetary gear carrier, the right planetary gear carrier carrying a plurality of right hand planetary gears at least partially positioned within the ring gear, the right planetary gear carrier operably coupled to a right output shaft;
   a left sun gear at least partially positioned within the plurality of left hand planetary gears;
   a right sun gear at least partially positioned within the plurality of right hand planetary gears; and
   a distributor shaft and a reversal gear operably coupling the left sun gear to the right sun gear, wherein disengagement between the distributor shaft and the reversal gear enables freewheeling rotation of the left output shaft and right output shaft.

2. The vehicle differential of claim 1, wherein the ring gear defines a set of teeth along an outer circumference configured to mesh with one or more gears of a vehicle transmission.

3. The vehicle differential of claim 1, wherein rotation of the ring gear causes rotation of the plurality of left hand planetary gears and the plurality of right hand planetary gears.

4. The vehicle differential of claim 1, wherein the left output shaft and the right output shaft are configured to rotate at an equal speed to one another when the left sun gear, the right sun gear, the distributor shaft, and the reversal gear are not rotating.

5. The vehicle differential of claim 1, wherein rotation of the left sun gear causes an equal and opposite rotation in the right sun gear, thereby creating a rotational speed differential between the right output shaft and the left output shaft.

6. The vehicle differential of claim 1, wherein contact between the ring gear and the plurality of left hand planetary gears and the plurality of right hand planetary gears provides a gear reduction ratio of at least one of about 1:1.2, about 1:1.3, about 1:1.4, about 1:1.5, about 1:1.6, about 1:1.7, about 1:1.8, about 1:1.9, or about 1:2.

7. A vehicle differential configured to enable variable speed between a first output shaft and a second output shaft, the vehicle differential comprising:
   a ring gear;
   a first planetary gear carrier, the first planetary gear carrier carrying a plurality of first planetary gears at least partially positioned within the ring gear, the first planetary gear carrier operably coupled to the first output shaft;

a second planetary gear carrier, the second planetary gear carrier carrying a plurality of second planetary gears at least partially positioned within the ring gear, the second planetary gear carrier operably coupled to the second output shaft;

a first sun gear at least partially positioned within the plurality of first planetary gears;

a second sun gear at least partially positioned within the plurality of second planetary gears; and a distributor shaft and a reversal gear operably coupling the first sun gear to the second sun gear, wherein disengagement between the distributor shaft and the reversal gear enables freewheeling rotation of the first output shaft and second output shaft.

8. The vehicle differential of claim 7, wherein the ring gear defines a set of teeth along an outer circumference configured to mesh with one or more gears of a vehicle transmission.

9. The vehicle differential of claim 7, wherein rotation of the ring gear causes rotation of the plurality of first planetary gears and the plurality of second planetary gears.

10. The vehicle differential of claim 7, wherein the first output shaft and the second output shaft are configured to rotate at an equal speed to one another when the first sun gear, the second sun gear, the distributor shaft, and the reversal gear are not rotating.

11. The vehicle differential of claim 7, wherein rotation of the first sun gear causes an equal and opposite rotation in the second sun gear, thereby creating a rotational speed differential between the first output shaft and the second output shaft.

12. The vehicle differential of claim 7, wherein contact between the ring gear and the plurality of first planetary gears and the plurality of second planetary gears provides a gear reduction ratio of at least one of about 1:1.2, about 1:1.3, about 1:1.4, about 1:1.5, about 1:1.6, about 1:1.7, about 1:1.8, about 1:1.9, or about 1:2.

13. The vehicle differential of claim 7, disengagement between the distributor shaft and the reversal gear enables freewheeling rotation of the first output shaft and the second output shaft.

14. A vehicle differential system configured to enable torque vectoring between a first output shaft and a second output shaft, the vehicle differential system comprising:

a ring gear;

a first planetary gear carrier, the first planetary gear carrier carrying a plurality of first planetary gears at least partially positioned within the ring gear, the first planetary gear carrier operably coupled to a first output shaft;

a second planetary gear carrier, the second planetary gear carrier carrying a plurality of second planetary gears at least partially positioned within the ring gear, the second planetary gear carrier operably coupled to a second output shaft;

a first sun gear at least partially positioned within the plurality of first planetary gears, a second sun gear at least partially positioned within the plurality of second planetary gears, and a distributor shaft and a reversal gear operably coupling the first sun gear to the second sun gear, wherein disengagement between the distributor shaft and the reversal gear enables freewheeling rotation of the first output shaft and second output shaft, wherein at least one of the first sun gear, the second sun gear, the distributor shaft, or the reversal gear is operably coupled to an electronic machine configured to modify rotation of the first sun gear, second sun gear, distributor shaft, and reversal gears to control a relative rotational speed between the first output shaft and the second output shaft.

15. The vehicle differential system of claim 14, wherein the electronic machine is configured to inhibit rotation of at least one of the first sun gear, the second sun gear, the distributor shaft, or the reversal gear.

16. The vehicle differential system of claim 14, wherein the electronic machine is configured to actively rotate at least one of the first sun gear, the second sun gear, the distributor shaft, or the reversal gear.

17. The vehicle differential system of claim 14, further comprising an electronic control unit configured to control the electronic machine.

18. The vehicle differential system of claim 17, wherein the electronic control unit is operably coupled to a vehicle sensor.

19. The vehicle differential system of claim 18, wherein the vehicle sensor is at least one of a steering wheel angle sensor, speed sensor, accelerometer, vibration sensor, or pressure sensor.

* * * * *